Patented Oct. 26, 1937

2,097,155

UNITED STATES PATENT OFFICE 2,097,155

TREATMENT OF UNSATURATED HALIDES AND PRODUCTS RESULTING THEREFROM

Herbert P. A. Groll, Berkeley, and Clarence J. Ott, San Francisco, Calif., assignors to Shell Development Company, San Francisco, Calif., a corporation of Delaware No Drawing. Application May 18, 1935, Serial No. 22,170. Renewed May 28, 1937

15 Claims. (Cl. 260—99.30)

This invention relates to a process for the preparation of useful and, in some cases, novel unsaturated organic compounds which comprises reacting an unsaturated halide possessing an olefinic linkage between two carbon atoms at least one of which is tertiary and one of which is linked to a saturated monohalogenated carbon atom with a metal compound selected from the group consisting of the metal salts of acids devoid of oxygen linked by both of its bonds to a single acid-forming element in the negative radical.

It is known that some saturated halides, and unsaturated halides which do not possess the active structural arrangement herein described, have been reacted to a very limited extent with certain metal compounds embraced by the group which we have found suitable for our purpose. In many cases, the saturated halides are unreactive under the conditions of execution of our invention. When reaction can be made to take place, it generally proceeds very slowly and incompletely, resulting in poor yields of the desired products. Efforts to increase the rate of the reaction by employing more rigorous reaction conditions and longer contact times of the reactants, result in the excessive occurrence of undesirable decomposition, polymerization and condensation reactions.

The differences between the method of our invention and the known methods with other types of halides is clearly shown by the following comparisons. When normal butyl chloride is contacted with dry sodium or calcium cyanide at temperatures of from 130° C. to 150° C., the corresponding butyl cyanide is only formed in an amount corresponding to about 60% of the theoretical. This low yield is due to the occurrence of side reactions which convert about 40% of the applied butyl chloride to butylene. When secondary saturated halides are treated, the side reactions occur to a still greater extent and even lower yields are attained. The poor yields attendant on the use of the cheaper metal cyanides discouraged the preparation of organic cyanides by this method. Slightly higher yields can be obtained by using cuprous cyanide, however, the cost of this chemical, along with the relatively low yields obtainable, renders the method prohibitive. In accordance with our invention, we may react unsaturated halides possessing an unsaturated tertiary carbon atom linked to or once removed from a saturated monohalogenated carbon atom with any sufficiently stable metal cyanide and obtain the corresponding unsaturated cyanide in yields exceeding about 95% of the theoretical. By our method, material economies are attendant on the use of the inexpensive metal cyanides and in addition substantially all of the applied unsaturated halide is converted to the unsaturated cyanide.

Saturated halides can be reacted with some of the alkali- and alkaline earth metal sulphides, hydrosulphides, mercaptides and the like to give very small amounts of the corresponding organic sulphur compound. The reaction proceeds slowly and incompletely while a large part of the applied halide is decomposed to olefinic hydrocarbons or hydrolyzed to the corresponding alcohol if water is present in sufficient amount. The unsaturated halides with which the process of this invention is concerned may be reacted with any sufficiently stable metal sulphide, hydrosulphide or mercaptide and the corresponding unsaturated sulphur compound obtained in practically quantitative yields. Our process provides a practical, economical and commercially feasible method for the production of a novel class of unsaturated mercaptans and sulphides.

We have found that the unsaturated halides to which the principles of our invention are applicable are relatively much more reactive with respect to the related metal compounds herein disclosed than the saturated halides and unsaturated halides which do not possess an unsaturated tertiary carbon atom linked by a single bond to a halogenated carbon atom or linked by a double bond to a carbon atom which in turn is linked to a saturated monohalogenated carbon atom. Accordingly, the unsaturated halides possessing such a structural arrangement can, by virtue of their relatively greater activity, be substantially completely reacted with a suitable metal compound at practical rates under conditions of temperature, pressure and contact time of the reactants at which the substantial occurrence of undesirable side reactions is avoided.

The metal compounds which we employ in the execution of our invention are selected from a group of chemically related compounds which behave in a like manner as regards their reaction with organic halides. The reaction which occurs in the execution of our invention comprises union of the unsaturated organic radical of the halide with the negative radical of the metal compound while the halogen atom of the unsaturated halide combines with the metal radical of the metal compound to form the corresponding metal halide.

The unsaturated halides employed in the execution of our invention comprise an unsaturated alkyl chain which chain may or may not be linked to a cyclic radical as of the aromatic, alicyclic and heterocyclic series, or the unsaturated alkyl chain may comprise part of an alicyclic structure. Suitable unsaturated halides are those possessing the structural grouping

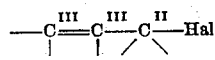

wherein at least one of the carbon atoms designated as $C^{III}$ is tertiary, that is, linked to at least three other carbon atoms. The $C^{II}$ carbon atom is preferably saturated and linked to a single halogen atom; however, other carbon atoms in the molecule may or may not be linked to one or more halogen atoms. The loose bonds may be taken up by hydrogen atoms and/or by the same or different radicals as hydroxyl, carbinol, alkyl, alkenyl, aralkyl, aralkenyl, carbocyclic, heterocyclic, alicyclic, alkoxy, aralkoxy and the like radicals which may be further substituted, it being understood that one of the $C^{III}$ carbon atoms is tertiary, that the $C^{II}$ carbon atom is monohalogenated and that a hydroxy group is not linked to an unsaturated carbon atom, to a halogenated carbon atom or to a carbinol group. A suitable halide may possess one or a plurality of double bonds. Particularly suitable polyolefinic halides are those possessing a like number of olefinic bonds and halogen atoms, each olefinic linkage embracing a tertiary carbon atom linked to a saturated monohalogenated carbon atom.

A preferred group of unsaturated halides includes, among others, compounds such as

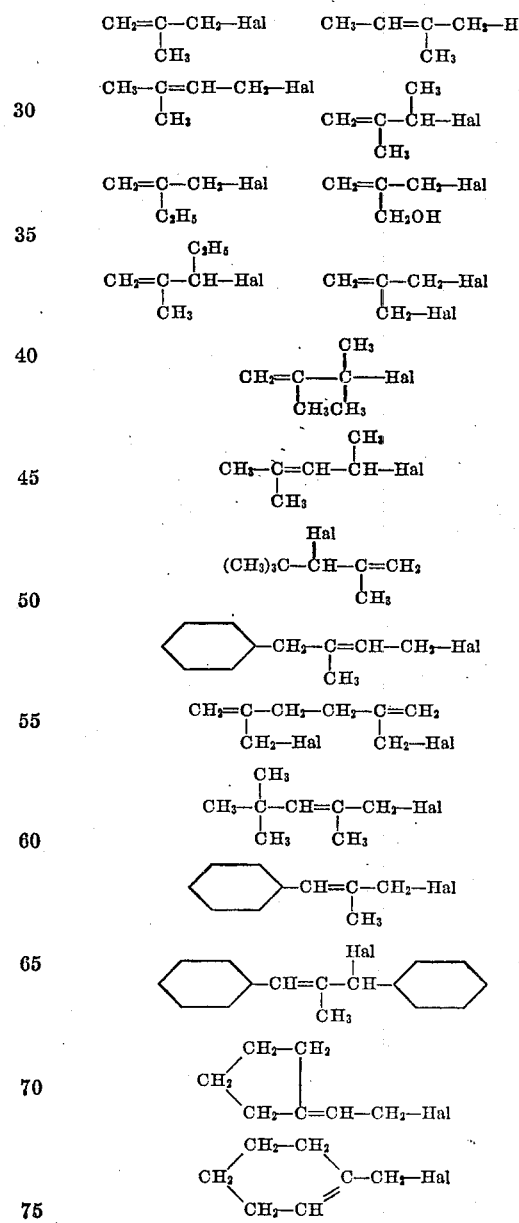

and the like and their homologues, analogues and suitable substitution products.

The unsaturated halides may be prepared by any of the methods known to the art and used severally or in mixtures comprising more than one species of unsaturated halides. In some cases, it may be advantageous to effect the reaction with the reactants dissolved or suspended in a relatively inert medium such as a hydrocarbon, halogenated hydrocarbon, mineral oil, ether, alcohol and the like. Suitable unsaturated halides may be conveniently prepared by effecting the chlorination of tertiary olefines. For example, we may, under suitable conditions, effect the chlorination of tertiary amylenes and obtain a mixture comprising one or more suitable isopentenyl halides, which mixture may be treated as such or, if several species are present they may be separated and independently treated.

In accordance with the invention, a suitable unsaturated halide is caused to react with a selected metal compound. A suitable metal compound is selected from the group consisting of metal compounds which may be represented by the formula M—X wherein M represents a metal and X may represent the negative radical of an acid devoid of oxygen linked by two bonds to the same acid-forming element contained therein. It is pointed out that the unsaturated halide may be reacted with a metal halide provided, of course, that the halogen atom or atoms of the metal halide is/are of a different species than the reactive halogen of the unsaturated halide. The particular metal may be mono- or polyvalent. In the case that the metal is polyvalent, the monovalent X radical may take up one or more of the valences, the other bonds being linked to suitable elements or groups. For example the type formula for a divalent metal compound may be $MX_2$ or —M—X wherein the loose bond may be taken up by suitable substituent such as a halogen atom. In the execution of our invention, the reaction which occurs may be represented by the equation: M—X + R—Hal→R—X + M—Hal wherein R represents an organic radical possessing an unsaturated tertiary carbon atom linked to a monohalogenated carbon atom or linked by a double bond to an unsaturated carbon atom which in turn is linked to a saturated monohalogenated carbon atom.

The nature of the metal component of the compound selected will be dependent on the stability and reactivity of the compound and on the particular negative radical with which it is in combination. Anyone sufficiently skilled in the art to which the invention pertains will be able to select a compound or group of compounds most suitable for his particular operation. In general, any metal compound of the type herein described which is possessed of the desired activity and/or stability may be employed. Particularly useful are the suitable compounds of metals such as the alkali- and alkaline earth metals, copper, zinc, silver, magnesium, cadmium, mercury, aluminum, thallium, tin, lead, bismuth, manganese, iron, nickel, cobalt, beryllium, antimony, etc. Compounds wherein the metal-acting ammonium radical takes the place of a metal are also contemplated as suitable compounds for the purposes of this invention. Due to the recognized metal character of the ammonium compounds, they may be considered as embraced by the term "metal compound" as used herein.

We have found that the salts of oxy-acids such as sulphuric, phosphoric, chromic and the like which possess an oxygen atom linked by both its bonds to a single acid-forming element in the negative radical of the acid are not operative in accordance with our invention. Accordingly, our process is limited to the use of salts of acids devoid of oxygen linked by both of its bonds to a single acid-forming element in the negative radical. A group of suitable salts includes among others, compounds such as sodium bromide, potassium iodide, silver chloride, silver bromide, sodium sulphide, sodium polysulphides, zinc sulphides, sodium selenide, potassium polysulphides, sodium hydrosulphide, sodium ethyl mercaptide, sodium isobutenyl mercaptide, mercury butyl mercaptide, sodium thiobenzylate, sodium seleno ethylate, calcium cyanide, sodium cyanide, ammonium cyanide, cuprous cyanide, sodium cyanate, potassium cyanate, sodium barbiturate, sodium urate, sodium thiocyanate, ammonium thiocyanate, potassium selenocyanate, potassium trithiocarbonate, the alkali- and alkaline earth metal alkyl, alkenyl, aralkyl and aryl xanthates, sodium phenolate, potassium naphtholate, sodium cresolate, potassium ferricyanide, sodium ferrocyanide, sodium azide and the like.

The reaction conditions to be employed in each case will be dependent on the type of reaction involved and on the specific activity of the metal compound selected. In many cases the reaction may be initiated on contact of the reactants at room temperature. Since the reaction may, in some cases, proceed too violently, we prefer to effect the reaction in the presence of a relatively inert heat responsive solvent or diluent for the unsaturated halide. Suitable substances for this purpose are the hydrocarbons, chlorinated hydrocarbons, ethers, esters, alcohols and the like. The reaction may be effected in any suitable reaction vessel preferably equipped with means for agitating as well as heating and cooling its contents. The reaction may be conveniently effected by adding a stoichiometrical amount or slight excess of the metal salt to the unsaturated halide which may or may not be dissolved or suspended in an inert solvent. The reaction may, in the great majority of cases, be effected at atmospheric pressure at the boiling temperature of the reaction mixture. The reaction product may be recovered from the reaction mixture in any suitable manner. For example, the reaction mixture may be refluxed until the reaction has proceeded to the desired extent; the cooled reaction mixture discharged from the reaction vessel and the metal halide separated therefrom by decantation, centrifugation and/or filtration. The liquid which contains the reaction product and may contain some unreacted unsaturated halide as well as an inert solvent or diluent may be treated in any suitable manner for recovery of the constituents thereof. For example, the reaction mixture may be distilled and the constituents separated by fractionation. Any unreacted unsaturated halide, as well as the recovered solvent or diluent may be reutilized in the same or another reactor.

When an unsaturated halide possessing an unsaturated tertiary carbon atom linked to or once removed from a saturated halogenated carbon atom is reacted with a metal salt of an acid devoid of oxygen linked by both of its bonds to a single acid-forming element in the negative radical, the metal salt may be applied in the solid state as powder, crystals, granules, pellets and the like or the salt may be applied in solution or suspension in a suitable relatively inert medium. For example, we may apply the salts dissolved in ketones, alcohols, glycols and other suitable inert solvents or mixtures thereof. When the salt is applied in the solid state or as a suspension, agitation of the reaction mixture may be desirable to insure efficient contact of the reactants. Agitation may be advantageously resorted to even when solutions of the reactants are employed. The unsaturated halides, severally or in combination may be employed in a substantially pure state or they may be dissolved in a suitable inert solvent such as an ether, alcohol, ketone and the like. The temperature of the reaction mixture may be kept substantially constant due to the vaporization of an excess of the unsaturated halide and/or an added heat responsive liquid solvent or diluent. Under such conditions, the reaction temperature is maintained at the boiling temperature of the heat responsive liquid without the use of external cooling means. The invention may be executed at any suitable temperature and pressure at which the reaction proceeds at a practical rate. With the metal salts, moderately elevated temperatures are in many cases required. If the optimum temperature of operation is above the atmospheric boiling temperature of the reaction mixture and it is desired to effect the reaction with the unsaturated halide in the liquid phase, superatmospheric pressures may be advantageously applied. If desired, the unsaturated halide may be reacted in the vapor phase. For example, the vapors of the unsaturated halide may be passed over the salt heated to the desired temperature or through fused salt baths.

For purposes of illustration, reference will be had to the following specific examples which typify preferred methods of executing our invention. It is to be understood that it is not our intention to limit ourselves to the specific operating conditions disclosed.

*Example I*

About 135.75 gm. (1.5 mols) of isobutenyl chloride and about 205.8 gm. (2.0 mols) of anhydrous NaBr were added to one liter of anhydrous acetone. The resulting mixture was stirred and refluxed at its boiling temperature for about 5 hours. At the end of this time the mixture was cooled, discharged from the reaction vessel and the solid removed therefrom by filtration. The filtrate was fractionated. After the unreacted isobutenyl chloride and acetone had been removed by distillation, a cut was collected in the boiling range of from about 92.0° C. to 92.5° C. at atmospheric pressure.

The isobutenyl bromide, which is a novel compound, was obtained. The unreacted isobutenyl chloride was recovered from the acetone and reutilized.

*Example II*

About 135.75 gm. (1.5 mols) of isobutenyl chloride were added to an anhydrous solution of about 300 gm. (2.0 mols) of NaI in methyl ethyl ketone. This mixture was stirred and refluxed at the atmospheric boiling temperature of the reaction mixture for about 3 hours. At the end of this time the reaction mixture was cooled, filtered and the filtrate fractionated.

The unreacted unsaturated chloride and the methyl ethyl ketone were distilled from the filtrate under atmospheric pressure. The reaction product was distilled under a subatmospheric pressure.

The main reaction product was isobutenyl iodide which compound boiled in the temperature range of from bout 25° C. to 30° C. under a pressure of from 3 mm. to 5 mm. of mercury. The unreacted isobutenyl chloride was recovered and reutilized.

Isobutenyl iodide is a novel compound. As a compound it is quite unstable and at elevated temperatures, or even on prolonged storage at room temperature, it may spontaneously decompose with a mild explosion.

*Example III*

About 336 gm. (3.72 mols) of isobutenyl chloride were charged to a reaction vessel equipped with a stirrer and a reflux condenser and about 450 gm. of $Na_2S.9H_2O$ (1.87 mols of $Na_2S$) were powdered and added thereto. This mixture was heated at the atmospheric boiling temperature of isobutenyl chloride (about 72° C.) for several hours. At the end of this time it was found that only a small portion of the isobutenyl chloride had reacted. It was evident that a higher temperature was required to make the reaction proceed at a practical rate.

The mixture was then transferred to a steel autoclave and agitated and heated at a temperature of about 120° C. for about 2 hours. The reaction mixture was extracted with ether and the ether extractant solution was dried and fractionated. The main reaction product was diisobutenyl sulphide which was probably formed in accordance with the reaction:

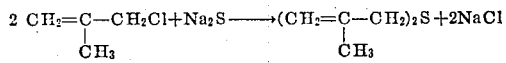

The diisobutenyl sulphide was obtained in a yield of about 95%. Diisobutenyl sulphide is a novel compound which boils in the temperature range of from about 172.8° C. to 173° C. under atmospheric pressure.

*Example IV*

About 205.7 gm. (1.87 mols) of $Na_2S_2$ were prepared by melting together about 450 gm. (1.87 mols $Na_2S$) of $Na_2S.9H_2O$ and about 60 gm. (1.87 mols) of sulphur.

About 336.0 gm. (3.72 mols) of isobutenyl chloride were charged to a steel autoclave and the $Na_2S_2$ added thereto. This mixture was agitated and heated at a temperature of about 120° C. under the vapor pressure of isobutenyl chloride for about one hour. The reaction was quite vigorous.

The cooled mixture was discharged from the autoclave and extracted with ether. The ether extract solution was decanted from the solid NaCl, dried and fractionated. The main reaction product was diisobutenyl disulphide which was distilled from the reaction mixture under a subatmospheric pressure following the removal of the ether.

Diisobutenyl disulphide, which is a novel compound, was obtained in a yield of about 94%.

*Example V*

About 98.5 gm. (1.1 mols) of cuprous cyanide were added to about 90.5 gm. (1.0 mol.) of isobutenyl chloride contained in a steel autoclave. This mixture was agitated and heated at a temperature of about 120° C. for about one hour. At the end of this time, the cooled reaction mixture was discharged from the reaction vessel, diluted with from 2 to 3 times its volume of acetone and the solid matter separated from the liquid mixture by filtration. The filtrate was fractionated. After removal of the acetone, the reaction product, isobutenyl cyanide, was distilled at a temperature of 137° C. under atmospheric pressure.

Isobutenyl cyanide, which product is a novel compound, was obtained in a yield of about 96% of the theoretical.

*Example VI*

About 53.9 gm. (1.1 mols) of sodium cyanide were added to about 90.5 gm. (1.0 mol.) of isobutenyl chloride and the mixture charged to a steel autoclave equipped with heating means and means for agitating its contents. The mixture was agitated and heated at a temperature of about 120° C. for about 3 hours. At the end of this time, the cooled mixture was extracted with acetone and the extractant solution separated from the formed sodium chloride and unreacted sodium cyanide by filtration. The filtrate was fractionated under atmospheric pressure.

Although the reaction proceeded somewhat more slowly than when the more costly and more reactive cuprous cyanide was used, a yield of about 90% of isobutenyl cyanide was obtained. The unreacted isobutenyl chloride was recovered and reutilized.

*Example VII*

About 905 gm. (10 mols) of isobutenyl chloride were added to a concentrated alcoholic solution containing about 793.9 gm. (11 mols) of potassium hydrosulphide (KSH). The mixture was refluxed at atmospheric pressure for about 5 hours while $H_2S$ was bubbled through it. At the end of this time sufficient water was added to the cooled mixture to dissolve the precipitated KCl and the mixture was extracted with ether. The extractant mixture was allowed to stratify and the ether layer dried and fractionated.

Isobutenyl mercaptan

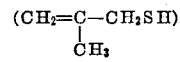

and di-isobutenyl sulphide were obtained in yields of 49% and 51%, respectively. The isobutenyl mercaptan boiled in a temperature range of from about 93° C. to 95° C. under a pressure of about 765 mm. of Hg. Isobutenyl mercaptan is a novel compound.

It will be evident to those skilled in the art to which our invention appertains that the same may be executed in a batch, intermittent or continuous manner. In an apparatus for continuous operation, the reaction could be conducted in one stage and the partially or completely reacted mixture rectified in an adjoining stage in which the product could be separated and the unchanged reactants and solvent or suspending medium, if present, conducted to the first or another reaction stage.

Novel and valuable unsaturated organic compounds are obtained by reacting unsaturated halides of the type herein described with metal sulphides, metal polysulphides, metal hydrosulphides, metal cyanides, metal mercaptides and metal halides the halogen of which is different than the reactive halogen of the unsaturated halide. These novel products may be represented by the general formula R—X, wherein R represents an organic radical possessing an olefinic linkage between two aliphatic carbon atoms at least one of which is tertiary and one of which is linked to a saturated carbon atom which in turn is linked to the monovalent radical X, and X represents the radical —Br, —I, —SH, —CN, —SR' or —S$_n$R', R' representing an organic radical with a free carbon linkage and $n$ representing an integer. The symmetrical and asymmetrical unsaturated thioethers and disulphides may be represented by the formula R—$S_n$—R', wherein $n$ represents an integer and R and R' may be the same or different organic radicals with a free carbon linkage, R representing an organic radical containing an olefinic linkage between two aliphatic carbon atoms at least one of which is tertiary and one of which is linked to a saturated carbon atom which in turn is linked to the —$S_n$— radical.

When an unsaturated halide of the type herein described is reacted with a metal hydrosulphide, the resulting product is the corresponding unsaturated mercaptan. Such unsaturated mercaptans may be used, severally or in combination, for a wide variety of purposes. The unsaturated mercaptans as well as mixtures containing them are useful as fly-repellents and insecticides. In addition, they are valuable intermediates in the preparation of many useful organic sulphur-containing compounds. For example, they may be converted to unsaturated mercaptals and mercaptols by reaction with aldehydes and ketones, respectively, or they may be esterified to thio-esters or oxidized to disulphides. In addition, the unsaturated mercaptans prepared by our method may be useful as agents in ore-flotation processes, or as intermediates in the preparation of dyes.

The unsaturated thio-ethers and polysulphides prepared in the execution of our invention are useful as solvents for a wide variety of organic compounds. These compounds or mixtures containing them in relatively large amounts may be useful as solvents for rubber and resins. The unsaturated organic sulphides or mixtures containing them are useful as fly-repellents and insecticides. The unsaturated thio-ethers, in particular, are valuable as intermediates in the production of pharmaceutical chemicals such as the soporific sulphones.

The unsaturated cyanides prepared by reacting a suitable unsaturated halide with a metal cyanide in accordance with the principles of this invention may be made the starting point for a large number of syntheses of valuable unsaturated organic chemicals, including carboxylic acids, amines, amides, alcohols, esters and the like. For example, the unsaturated cyanides may be hydrolyzed to yield carboxylic acids and ammonia. The hydrolysis may be effected in the presence of alcohols, resulting in the formation of carboxylic acid esters.

The unsaturated chlorides may be reacted with metal bromides and iodides resulting in the formation of the corresponding bromide or iodide, respectively, by the occurrence of a double decomposition reaction. The unsaturated monohalides which possess an unsaturated tertiary carbon atom linked to or once removed from a carbon atom which is linked directly to a bromine or iodine atom are novel compounds.

While we have described our invention in a detailed manner and provided specific examples illustrating suitable modes of executing the same, it is to be understood that this mode of presentation was only for the purpose of making the principles of the invention clear and understandable and that modifications may be made, since no limitations on the invention other than those imposed by the scope of the appended claims are intended.

We claim as our invention:

1. A process for the production of a valuable unsaturated organic compound which comprises reacting an unsaturated halide possessing an alkyl chain containing an olefinic linkage between two carbon atoms at least one of which is tertiary and one of which is linked to a saturated monohalogenated carbon atom with a metal salt of an acid devoid of oxygen linked by a double bond to a single acid-forming element in the negative radical.

2. A process for the production of a valuable unsaturated organic compound which comprises reacting an unsaturated chloride possessing an alkyl chain containing an olefinic linkage between two aliphatic carbon atoms at least one of which is tertiary and one of which is linked to a saturated monochlorinated carbon atom with a metal salt of an acid devoid of oxygen linked by a double bond to a single acid-forming element in the negative radical.

3. A process for the production of a valuable unsaturated organic compound which comprises reacting an unsaturated chloride possessing only one olefinic linkage between two aliphatic carbon atoms at least one of which is tertiary and linked to a saturated monochlorinated carbon atom with a metal salt of an acid devoid of oxygen linked by a double bond to a single acid-forming element in the negative radical.

4. A process for the production of a valuable unsaturated organic compound which comprises reacting isobutenyl chloride with a metal salt of an acid devoid of oxygen linked by a double bond to a single acid-forming element in the negative radical.

5. A process for the production of a valuable unsaturated sulphide which comprises reacting isobutenyl chloride with a metal sulphide.

6. A process for the production of isobutenyl cyanide which comprises reacting isobutenyl chloride with a metal cyanide.

7. The unsaturated organic sulphide of the formula R—$S_n$—R', wherein $n$ represents an integer and R and R' may be the same or different organic radicals with a free carbon linkage, R representing an unsaturated organic radical containing an olefinic linkage between two aliphatic carbon atoms at least one of which is tertiary and one of which is linked to a saturated carbon atom which in turn is linked by a single bond to the —$S_n$— radical.

8. The unsaturated organic sulphide of the formula R—$S_n$—R, wherein $n$ represents an integer and R represents an unsaturated organic radical containing an aliphatic unsaturated tertiary carbon atom linked to a saturated carbon atom which in turn is linked to the —$S_n$— radical.

9. The diisobutenyl sulphide of the formula

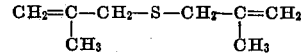

10. The isobutenyl cyanide of the formula

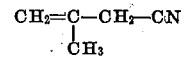

11. A process for the production of a valuable unsaturated organic sulphur compound which comprises reacting an unsaturated halide possessing an alkyl chain containing an olefinic linkage between two aliphatic carbon atoms at least one of which is tertiary and one of which is linked to a saturated monohalogenated carbon atom with a metal salt selected from the group consisting of the metal hydrosulphides, metal mercaptides, metal sulphides and metal polysulphides.

12. A process for the production of a valuable unsaturated organic sulphur compound which comprises reacting isobutenyl chloride with a metal salt selected from the group consisting of the metal hydrosulphides, metal mercaptides, metal sulphides and metal polysulphides.

13. The unsaturated organic compound of the general formula R—X, wherein R represents an unsaturated organic radical containing an unsaturated tertiary carbon atom linked by a double bond to a terminal methene group and by a single bond to a saturated carbon atom which in turn is linked to the monovalent radical X, and X represents a negative monovalent radical of a weak acid selected from the group consisting of —CN, —SH, —SR', and —SnR', R' representing an organic radical linked to the sulphur atom by means of a carbon atom and $n$ representing an integer equal to at least two.

14. The unsaturated organic compound of the general formula $$CH_2=C-CH_2-X$$
$$\phantom{CH_2=}|$$
$$\phantom{CH_2=}CH_3$$

wherein X represents a negative monovalent radical of a weak acid selected from the group consisting of —CN, —SH, —SR' and —SnR', R' representing an organic radical linked to the sulphur atom by means of a carbon atom and $n$ representing an integer equal to at least two.

15. An unsaturated organic thiocyanate possessing an alkyl chain containing an olefinic linkage between two carbon atoms at least one of which is tertiary and one of which is linked to a saturated carbon atom which in turn is linked to the thiocyano radical.

HERBERT P. A. GROLL.
CLARENCE J. OTT.